Nov. 1, 1966    E. E. BARNETT    3,282,319
TIRE PATCH
Filed Aug. 13, 1965    2 Sheets-Sheet 2
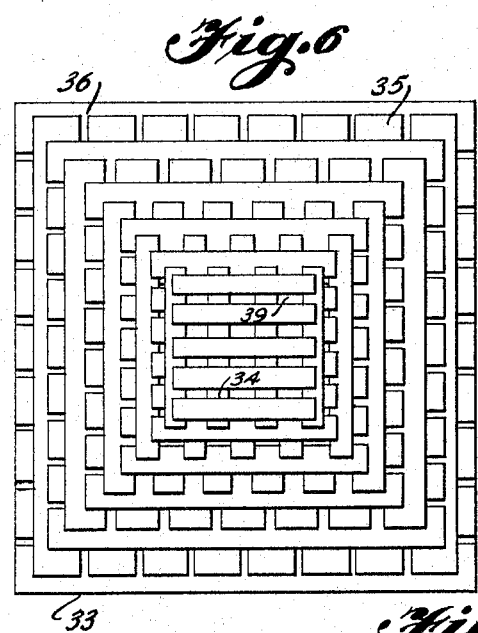
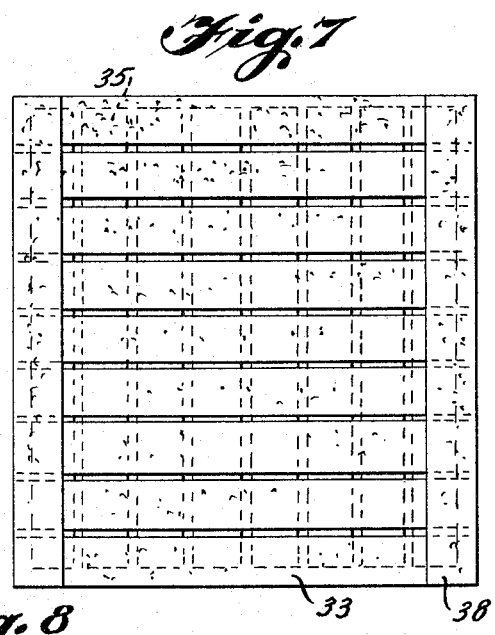
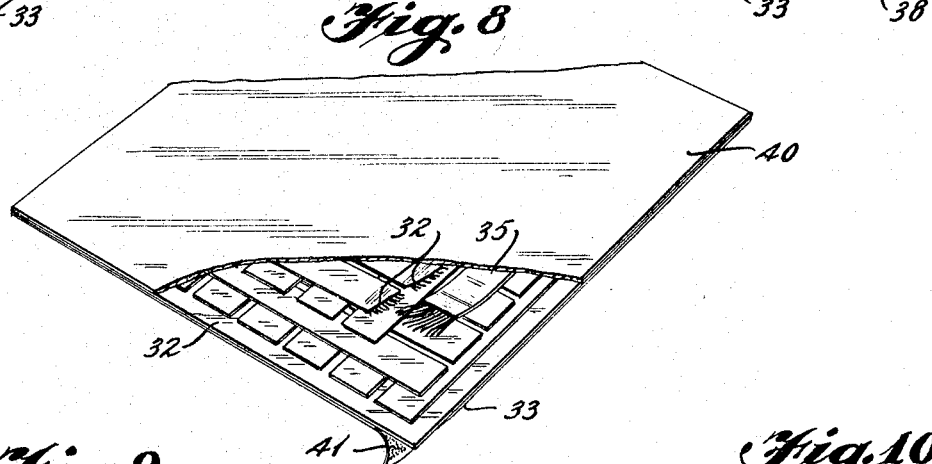
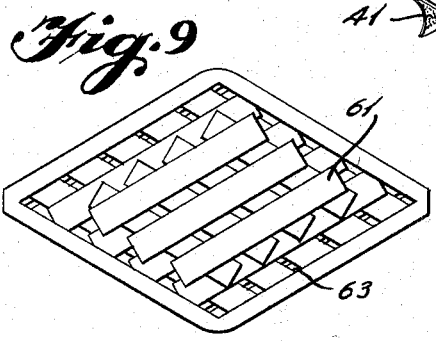
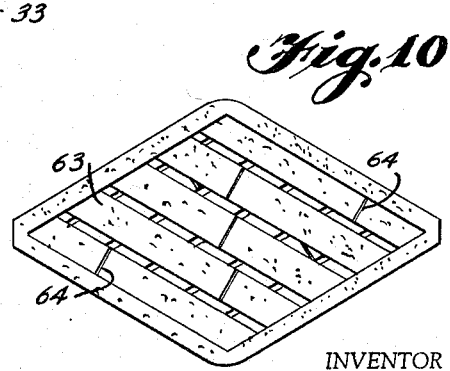
INVENTOR
ERNEST E. BARNETT
BY
ATTORNEYS __United States Patent Office__

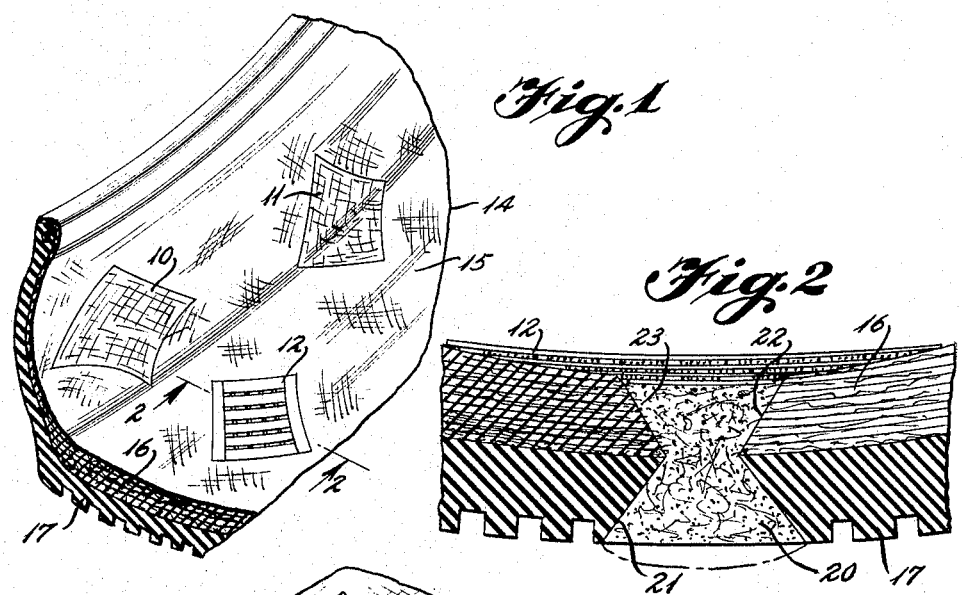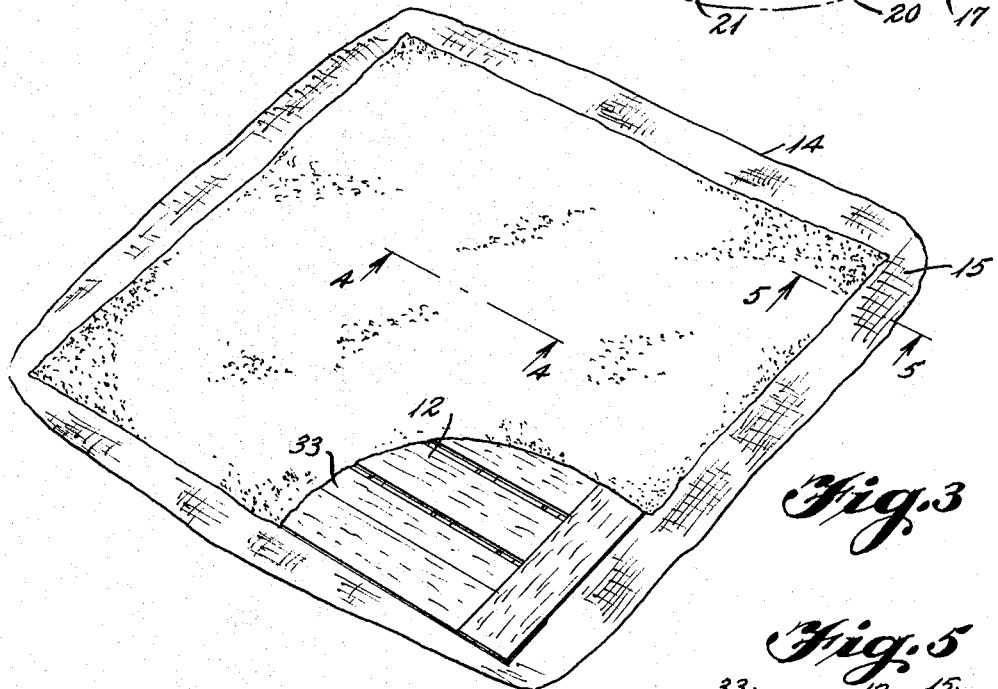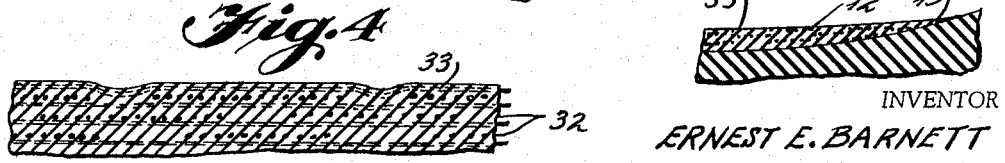

3,282,319
Patented Nov. 1, 1966

3,282,319
TIRE PATCH
Ernest E. Barnett, Salem, Va., assignor to
Myers Industries, Inc., Akron, Ohio
Filed Aug. 13, 1965, Ser. No. 479,422
10 Claims. (Cl. 152—367)

This invention relates to pneumatic tires including those of the most valuable first quality expensive variety, an important use of which is for the support of vehicles carrying great weight such as tires of road building machines and the like, the normal life of which is relatively short but the life of which tires efforts are being made to prolong due to the costly nature of the same.

The invention relates particularly to the repair of pneumatic tires including a tire patch having embedded cords designed to provide the necessary strength for supplementing that of the original tire to which the patch is applied, to the manner of using such tire patch, and to the repair of tires utilizing the principle of such tire patches.

Pneumatic tires comprised of layers of cord embedded in rubber-like material frequently are damaged by punctures, etc. It is conventional to repair such damage by: (1) cutting out the damaged area; (2) filling the cut-out area with unvulcanized rubber; and (3) placing a patch containing cords embedded in unvulcanized rubber in the inner surface of the tire so that the cords overlie the cut-out area; and (4) subjecting the patch and replacement material to heat to vulcanize the plug and the rubber in the patch and to bind these and the cords to the rubber of the original tire carcass.

The ordinary pitch used in such repairs comprises a plurality of rectangular sheets of a special fabric. The fabric is formed of unvulcanized rubber in which are embedded cords running lengthwise of the rectangular sheet. The sheets cross each other at an angle, usually perpendicularly. The result is a patch in the shape of a cross, such patch having a square central portion with wing portions on each side of the square formed by the ends of the rectangular sheets.

Even the best of such prior art patches have been relatively short lived, and the repair frequently failed usually at the ends of the cords of the patch. The chief cause of this is believed to be the low flexibility of the patched area as compared to that of the original tire carcass. As a result, continual flexing of both the original tire carcass and the patched or repaired area may have caused strains on the cords of the patch at their ends. Considerable effort has been devoted to minimizing such tearing loose of the cords with only partial and varying degrees of success obtained.

As a result of this short life, this type of patching generally has not been used with great success in vehicles traveling at dangerous speeds, such as passenger automobiles and highway trucks. This patching method has found its greatest utility in the repair of the tires of heavy, slow-moving equipment which moves over unimproved terrain, and particularly road building equipment. Such tires are quite large and expensive with some costing several thousand dollars. Because they are likely to be punctured by objects such as the sharp projections of rocks, broken-off metal stakes, and other objects, punctures are relatively frequent. Even though the patch may have an operational life of the order of only 8 to 10 hours, repair is economically necessary because of the great original cost of the tires. The short life of patches results in a great loss in the use of such machines while tires are being replaced or repaired.

Accordingly, there is a great need for a tire repairing method in which the repaired area will have a longer life and greater flexibility.

Accordingly, a major object of this invention is to provide a tire patching method in which the repaired area has longer life and is less likely to fail. A further object of the invention is to provide a tire patch for use in the repair of such tires which is less likely to tear loose from the original tire carcass and in which the cords are more strongly bonded to the original carcass and in which the resultant repaired area has greater flexibility.

Other objects and advantages of the invention will be apparent from the following description taken in conjunction with the accompanying drawings in which:

FIG. 1 illustrates a fragmentary view of a tire repaired in accordance with the present invention;

FIG. 2, a sectional view on the line 2—2 of FIG. 1;

FIG. 3, a perspective view having some portions broken away, of a tire patch to be utilized with the present invention;

FIG. 4, a sectional view on the line 4—4 of FIG. 3;

FIG. 5, a sectional view on the line 5—5 of FIG. 3;

FIG. 6, a plan view of the inner surface of a tire patch constructed in accordance with the present invention;

FIG. 7, a plan view illustrating the outer surface of the tire patch of FIG. 6;

FIG. 8, a fragmentary view with some parts broken away or removed, of the tire patch of FIG. 6;

FIG. 9, a plan view of the inner surface of a different form of tire patch according to the invention;

FIG. 10, a plan view of the outer surface of the tire patch of FIG. 9; and

FIG. 11, a fragmentary perspective view with some portions broken away, of a cord-carrying strip of fabric used in the present invention.

Briefly stated, in accomplishing the objects desired, a new type of patch is used to reinforce the rubber which replaces the damaged area.

This path comprises a plurality of layers, each composed of a plurality of long, narrow, generally rectangular fabric strips. The sides of adjacent strips in a given layer are spaced from each other. Each fabric strip includes a group of parallel closely spaced cords running lengthwise of the strip and embedded in unvulcanized rubber. Satisfactory results have been obtained without the wing portion as is usually found on the side of the central square of the conventional prior art patch.

Referring to the drawings, a plurality of patches 10, 11 and 12 cover repaired areas of a tire 14. Patch 10 is located in the side wall of the tire where flexing is great during operational use. Patch 12 is located in the tread area of the tire where normal flexing is less, but is greater when the particular area of the tire strikes an uneven projection such as a rock or projection on the ground. Patch 11 is located at the juncture of the side wall and tread area. Such a patch is subjected to particular strain since the side wall flexes to a different extent than the tread area and patches so located fail quite frequently in use.

The patch is usually located on the inner surface 15 of a tire wall having an inner area 16 in which the cord plies are normally embedded and an outer area 17 in which the treads are located. Replacement material 20 has been used to fill a damaged area 21. The side surfaces 22, 23 of the damaged area have been skived or beveled the better to retain the replacement material 20.

The patch includes a number of layers, for example, 32, 33 and 34 in which cords are embedded. Each layer includes a plurality of fabric strips 35 having gaps 36 therebetween. The fabric of each strip consists of a number of closely adjacent parallel cords embedded in vulcanized rubber commonly referred to as cushion gum. It is sold by many manufacturers. As furnished, it usually includes additives that help in the vulcanizing and curing process. A fabric thus made also is regularly sold. Strips 35 can be cut from such a fabric or can be made separately. An entire layer might also be made at the same time by embedding spaced groups of parallel cords in cushion gum.

An outer layer 33 has strips of a greater length which cover a wider area than do the strips that form an innermost layer 34. Satisfactory results have been obtained with patches in which sides of an innermost layer 34 have approximately ⅓ the dimensions of the sides of the outermost layer 33. Intermediate layers are of intermediate size so that a pyramid-like mass is formed. The outermost layer 33 has strips 38 joining the ends of the outer surface of the strips that form this layer. The spacing 39 between strips of the innermost layer 34 is substantially greater than spacing 36 between the strips of the outermost layer 33.

Cushion gum is a slightly sticky substance at ordinary room temperatures. Accordingly, as soon as the strips are formed into layers, the gum of the various layers sticks together. Accordingly, no other provision is needed to keep the patch together as a unit prior to use. The inner and outer surfaces of the patch may be covered with layers 40, 41 of a material such as holland cloth to which the cushion gum will not stick. This will be removed before use.

The number of plies and the size of a patch vary with the size of the tire injury and the plies of the tire. The following have been found satisfactory:

*Tire*

| Size: | Plies |
|---|---|
| 6 x 6 | 6 |
| 8 x 8 | 8 |
| 9 x 9 | 8 |
| 9 x 9 | 10 |
| 12 x 12 | 14 |
| 14 x 14 | 16 |
| 16 x 16 | 18 |
| 18 x 18 | 18 |

*Patch*

| Injury: | |
|---|---|
| 2″ | 12 |
| 4″ | 14 |
| 6″ | 8–12 |
| 4½″ | 14–20 |
| 6″ | 20–24 |
| 8″ | 20–24 |
| 9″ | 30–34 |
| 9″ | 30–34 |

FIGS. 9 and 10 disclose a modified form of a tire patch in accordance with the present invention. In this modification, some strips of the individual layers cross each other at an angle other than 90° so that a diamond-shaped patch is formed instead of a square-shaped patch. This shaped patch has utility in tires in which the cords of the originally manufactured plies cross each other at such non-perpendicular angles. The cords that reinforce the patched area are thus more closely aligned with the cords of the original tire carcass and thus flex better with them.

Each layer of this modified patch is formed of strips 61 of a fabric consisting of closely adjacent lengthwise parallel cords embedded in cushion gum with some strips 63 discontinuous. Each of the strips 63 is cut at intermediate point 64 into two portions. Accordingly, the cords do not extend across the full width of the patch. This makes for greater flexibility since stresses acting on one side of the patch are not completely transmitted to the other side of the patch. The various cuts 64 are so staggered that there is no continuous "break" area of cords and different cord lengths overlie each other.

A damaged area of a tire may be patched in the following manner:

(1) The damaged portion of the tire is skived or cut from the carcass leaving an edge with 45° bevels meeting at approximately the center of the tire.

(2) The edges of the carcass are buffed and cleaned.

(3) The cut-out area is filled with unvulcanized rubber of a type called tread compound. This is very similar to cushion gum but contains an abrasive to increase its coefficient of friction. The plug of tread compound is allowed to project approximately 1/16 of an inch above the interior surface to allow for flowing during later vulcanization.

(4) The patch as previously described is laid on the inner surface. Particularly good results are obtained if the innermost layer 36 fits completely within the cut-out area, and the outermost layer 33 extends well into the original carcass area. As an example of sizes, a patch 9″ square with an innermost layer 34 3″ square has been used to cover a cut-out area approximately 4″ square.

(5) The edge of the patch is rolled down or "stitched" to cause it to adhere to the inner surface of the tire. A sheet of cushion gum of approximately the same size as the patch is laid over the inner surface of the patch.

(6) The tire is placed in a mold for heat treatment and curing. Heat treating is conducted at the temperature and for the usual time specified by the manufacturer of the particular tread compound and cord fabric cushion gum compound. The unvulcanized rubber being thermoplastic flows around the cords and bonds them to the carcass.

If the tire is of the tubeless type having a liner, the liner normally is removed before any of the other steps are performed and is replaced after vulcanizing.

During the vulcanizing process, the cushion gum and tread compound flow together and become closely bonded to the original tire carcass. In addition, cushion gum flows through the spacings 36 and 39 between the strips of the various layers. This flow is facilitated by the greater spacing 39 between the strips of the innermost layer than that between the outermost layer.

As a result, the final repaired tire comprises: (1) the original carcass; (2) an area in which damaged material has been replaced; and (3) an area in which groups of cords are embedded in rubber. These cords are arranged in layers. Within each layer there are groups of cords spaced from other groups of cords. This spacing permits greater flexibility. The innermost layer of cords fits substantially within the patched area. Successive layers overlie the patched area and are bonded to the original carcass at successively greater distances from the patched area.

Commencing in January 1965 applicant began the use of this method to repair tires coming into the shop he manages. Sufficient experimental data has not yet been obtained to determine the full life of such patches. However, most of these repaired tires are still in use on various types of heavy equipment while tires repaired with conventional patches normally would have failed long ago.

The reason for the superior performance is believed to be as follows: Under certain conditions of flexing in operational use, the area of a tire at one side of a patch might be very substantially stretched, whereas the area at the other side of the patch might be either stretched not at all, or only slightly, or even compressed. Under such conditions various groups of cord are believed to accommodate themselves better to the distortions, and the cords automatically assume a proper, desired angle relative to each other when they are arranged in spaced groups. In addition the platform-like construction of the patch in individual steps produces a repaired tire in which the ends of the cords are bonded to the original tire carcass at several different positions.

The usual patch has a wing tip at each of its sides and the ends of the cords are bonded to the tire carcass at the ends of the wing tips. Separation of the tire from a patch generally commences in the wing tip area, and this area weakness has thereby been eliminated. The central plug area of the replacement material is much better bound to the cord strips because of the spacing between adjacent groups of cords. Accordingly it is more durable and more flexible and less likely to fail in use.

It will be readily apparent that a tire patch has been provided which when applied in the manner taught in the present invention will provide a repaired tire in which the tendency of patch cords to tear loose from the original carcass is greatly minimized.

It will be obvious to those skilled in the art that various changes may be made in the invention without departing from the spirit and scope thereof and therefore the invention is not limited by what is illustrated in the drawings and described in the specification, but only as indicated in the accompanying claims.

What is claimed is:

1. A patch for use in the repair of pneumatic tires made of rubber-like material and embedded cord comprising
   (a) a layer of flat strips laid in edge to edge spaced parallel relation,
   (b) said strips being made of a fabric including parallel cords running generally lengthwise of the strip embedded in an elastomer material, and
   (c) means joining said individual flat strips and forming a substantially flat unitary patch.

2. A patch for use in the repair of pneumatic tires of rubber-like material comprising
   (a) a layer of parallel cords arranged in parallel groups, the cords within each group being spaced relatively closely to each other with a relatively wider spacing between adjacent groups of cords,
   (b) a second layer of similarly aligned groups of cords crossing a number of groups of cords of the first layer at an angle, and
   (c) means to hold said groups of cords together so that the patch forms a substantially flat unit.

3. The structure of claim 2 in which adjacent layers have cords of successively shorter lengths.

4. The structure of claim 2 in which adjacent layers are of successively shorter widths and have cords of successively shorter lengths whereby the patch comprises a pyramidal platform of cords.

5. The structure of claim 2 in which successive layers of cords have progressively greater spaces between adjacent groups of cords in the layer.

6. The structure of claim 2 in which at least one outer surface of the patch is covered with a sheet of unvulcanized rubber-like material.

7. The structure of claim 2 in which at least some cords of the group are discontinuous and do not extend the full length of the layer.

8. A patch for use in pneumatic tires comprising
   (a) a plurality of layers of flat strips laid in edge to edge spaced parallel relationship,
   (b) each strip comprising a plurality of parallel cords embedded in a tacky rubber-like material, and
   (c) adjacent layers of strips crossing each other at an angle and being in contact with each other whereby the strips of each layer are held in their spaced relationship by the adhesion of the tacky rubber-like material of the strips.

9. The structure of claim 8 in which the said tacky rubber-like material is unvulcanized whereby upon application of heat the material will flow and bond the cords together and to suitable adjacent materials with which the patch may be in contact.

10. A patch for use in pneumatic tires comprising
    (a) a plurality of layers of flat strips laid in edge to edge spaced parallel relationship,
    (b) each strip comprising a plurality of parallel cords embedded in a rubber-like material, and
    (c) adjacent layers of strips crossing each other at an angle and being in contact with each other, and means holding the strips together to form a unitary patch.

References Cited by the Examiner

UNITED STATES PATENTS

| 509,904 | 12/1893 | Holt | 152—367 |
|---|---|---|---|
| 1,692,054 | 11/1928 | Semler | 152—367 |
| 3,080,807 | 3/1963 | Barrett | 152—367 |
| 3,133,585 | 5/1964 | Iknayan | 152—367 |

ARTHUR L. LA POINT, *Primary Examiner.*

C. W. HAEFELE, *Assistant Examiner.*